(12) United States Patent
Saha et al.

(10) Patent No.: US 8,656,113 B2
(45) Date of Patent: *Feb. 18, 2014

(54) ACCELERATING SOFTWARE LOOKUPS BY USING BUFFERED OR EPHEMERAL STORES

(75) Inventors: Bratin Saha, Santa Clara, CA (US); Ali-Reza Adl-Tabatabai, Santa Clara, CA (US); Ethan Schuchman, West Lafayette, IN (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/104,681

(22) Filed: May 10, 2011

(65) Prior Publication Data

US 2011/0276761 A1 Nov. 10, 2011

Related U.S. Application Data

(63) Continuation of application No. 11/965,143, filed on Dec. 27, 2007.

(51) Int. Cl.
*G06F 12/08* (2006.01)

(52) U.S. Cl.
USPC .......................................... 711/144; 711/141

(58) Field of Classification Search
None
See application file for complete search history.

(56) References Cited

U.S. PATENT DOCUMENTS

| | | | |
|---|---|---|---|
| 8,078,807 B2* | 12/2011 | Saha et al. ..................... | 711/144 |
| 2006/0212659 A1* | 9/2006 | Dieffenderfer et al. ....... | 711/141 |
| 2008/0059717 A1 | 3/2008 | Saha et al. | |
| 2008/0162886 A1* | 7/2008 | Saha et al. .................... | 712/214 |
| 2008/0270745 A1 | 10/2008 | Saha et al. | |
| 2009/0006767 A1* | 1/2009 | Saha et al. .................... | 711/145 |
| 2009/0019231 A1* | 1/2009 | Cypher et al. ................ | 711/141 |

* cited by examiner

*Primary Examiner* — Than Nguyen
(74) *Attorney, Agent, or Firm* — Blakely, Sokoloff, Taylor & Zafman LLP

(57) ABSTRACT

A method and apparatus for accelerating lookups in an address based table is herein described. When an address and value pair is added to an address based table, the value is privately stored in the address to allow for quick and efficient local access to the value. In response to the private store, a cache line holding the value is transitioned to a private state, to ensure the value is not made globally visible. Upon eviction of the privately held cache line, the information is not written-back to ensure locality of the value. In one embodiment, the address based table includes a transactional write buffer to hold addresses, which correspond to tentatively updated values during a transaction. Accesses to the tentative values during the transaction may be accelerated through use of annotation bits and private stores as discussed herein. Upon commit of the transaction, the values are copied to the location to make the updates globally visible.

23 Claims, 6 Drawing Sheets

ACCELERATING SOFTWARE LOOKUPS BY USING BUFFERED OR EPHEMERAL STORES

CROSS-REFERENCE TO RELATED APPLICATION

This application is a Continuation of U.S. patent application Ser. No. 11/965,143, Filed on Dec. 27, 2007, and entitled "ACCELERATING SOFTWARE LOOKUPS BY USING BUFFERED OR EPHEMERAL STORES". These applications are incorporated herein by reference in their entirety.

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflict resolution, abort tasks, and other transactional tasks are performed in software.

As one example, a write-buffering STM holds a latest value of an address location in an internal log. Upon commit of the transaction, the latest value in the log is made globally visible as the correct value of the address location. However, when a subsequent update to the address location during a pendancy of a transaction occurs, the log is searched for a corresponding address and the update of the latest value is made to the log. The process of searching a software maintained log may potentially adversely affect execution speed.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, transaction hardware, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values. In addition, the terms reset and set, in one embodiment, refer to a default and an updated value or state, respectively. For example, a default value potentially includes a high logical value, i.e. reset, while an updated value potentially includes a low logical value, i.e. set.

The method and apparatus described herein are for accelerating lookups in addressed based tables. Specifically, accelerating lookups is primarily discussed in reference to lookups for a write buffering software transactional memory (STM) system. However, the methods and apparatus for lookups are not so limited, as they may be implemented on or in association with any integrated circuit device or system, such as cell phones, personal digital assistants, embedded controllers, mobile platforms, desktop platforms, and server platforms, as well as in conjunction with any address based lookup table and any transactional memory system.

Figure 1:
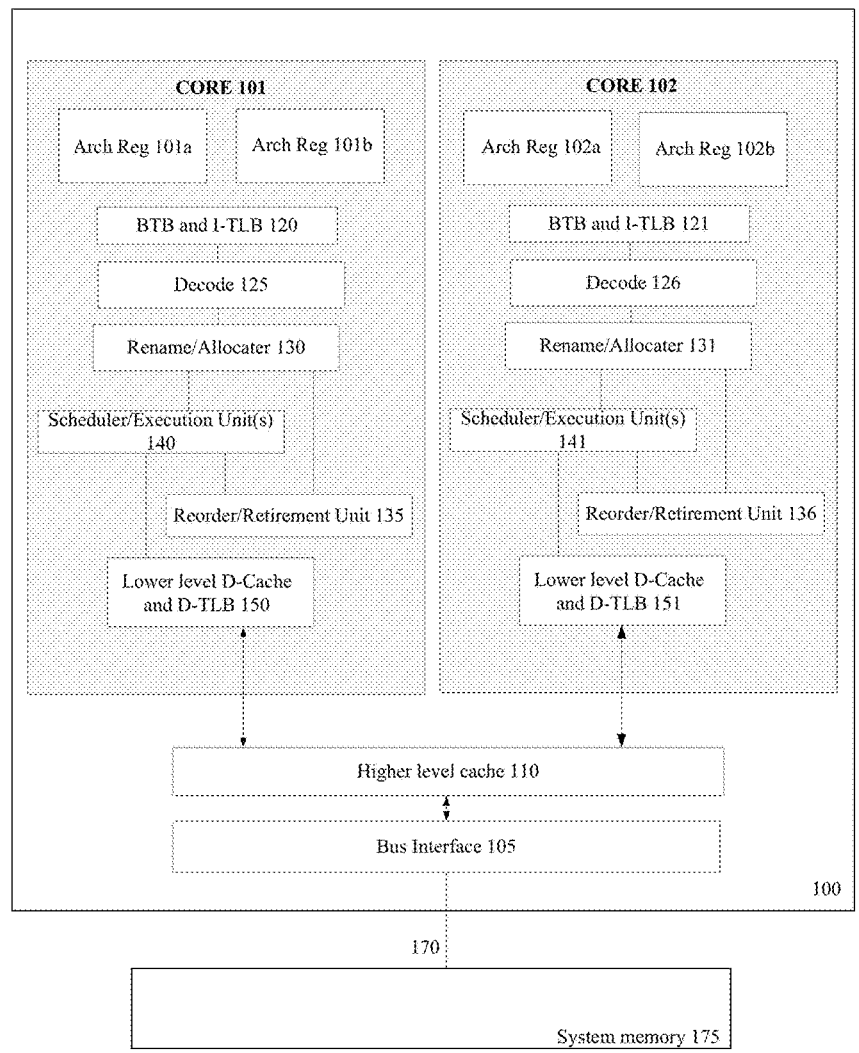
FIG. 1 illustrates an embodiment a system capable of fine grained conflict detection during transactional execution.

Referring to FIG. 1, an embodiment of a multi-processing element processor capable of accelerating lookups in address based tables is illustrated. A processing element refers to a thread, a process, a context, a logical processor, a hardware thread, a core, and/or any processing element, which shares access to resources of the processor, such as reservation units, execution units, pipelines, and higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. Physical processor 100, as illustrated in FIG. 1, includes two cores, core 101 and 102, which share access to higher level cache 110. In addition, core 101 includes two hardware threads 101a and 101b, while core 102 includes two hardware threads 102a and 102b. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101a, a second thread is associated with architecture state registers 101b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL++bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages. Data cache 150 may be utilized as a transactional memory or other memory to track tentative accesses during execution of a transaction, as discussed in more detail below. Furthermore, when tracking tentative accesses utilizing a S™ system, software tables/data may be held in system memory 175 and cached in lower level cache 150.

A transaction, which may also be referred to as a critical section of code, includes a grouping of instructions, operations, or micro-operations, which may be grouped by hardware, software, firmware, or a combination thereof. For example, instructions or operations may be used to demarcate a transaction or a critical section. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendancy, the transaction is restarted without making the updates globally visible. As a result, pendancy of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination thereof.

A Hardware Transactional Memory (HTM) system often refers to tracking access during execution of a transaction with processor 100 in hardware of processor 100. For example, cache 150 is to cache a data item/object from system memory 175. During execution of a transaction, an annotation/attribute field, which is associated with the cache line in cache 150 holding the data object is utilized to track accesses to and from the cache line. In one embodiment, the annotation field includes a read storage cell and a write storage cell. Each of the storage cells is set upon the corresponding read or write to indicate if a read or write has occurred during a pendancy of a transaction.

A Software Transactional Memory (STM) system often refers to performing access tracking, conflict resolution, or other transactional memory tasks in or at least partially in software. As a general example, a compiler, when executed, compiles program code to insert read and write barriers for load and store operations, accordingly, which are part of transactions within the program code. A compiler may also insert other transaction or non-transaction related operations, such as commit operations, abort operations, bookkeeping operations, conflict detection operations, and strong atomicity operations.

Figure 2:
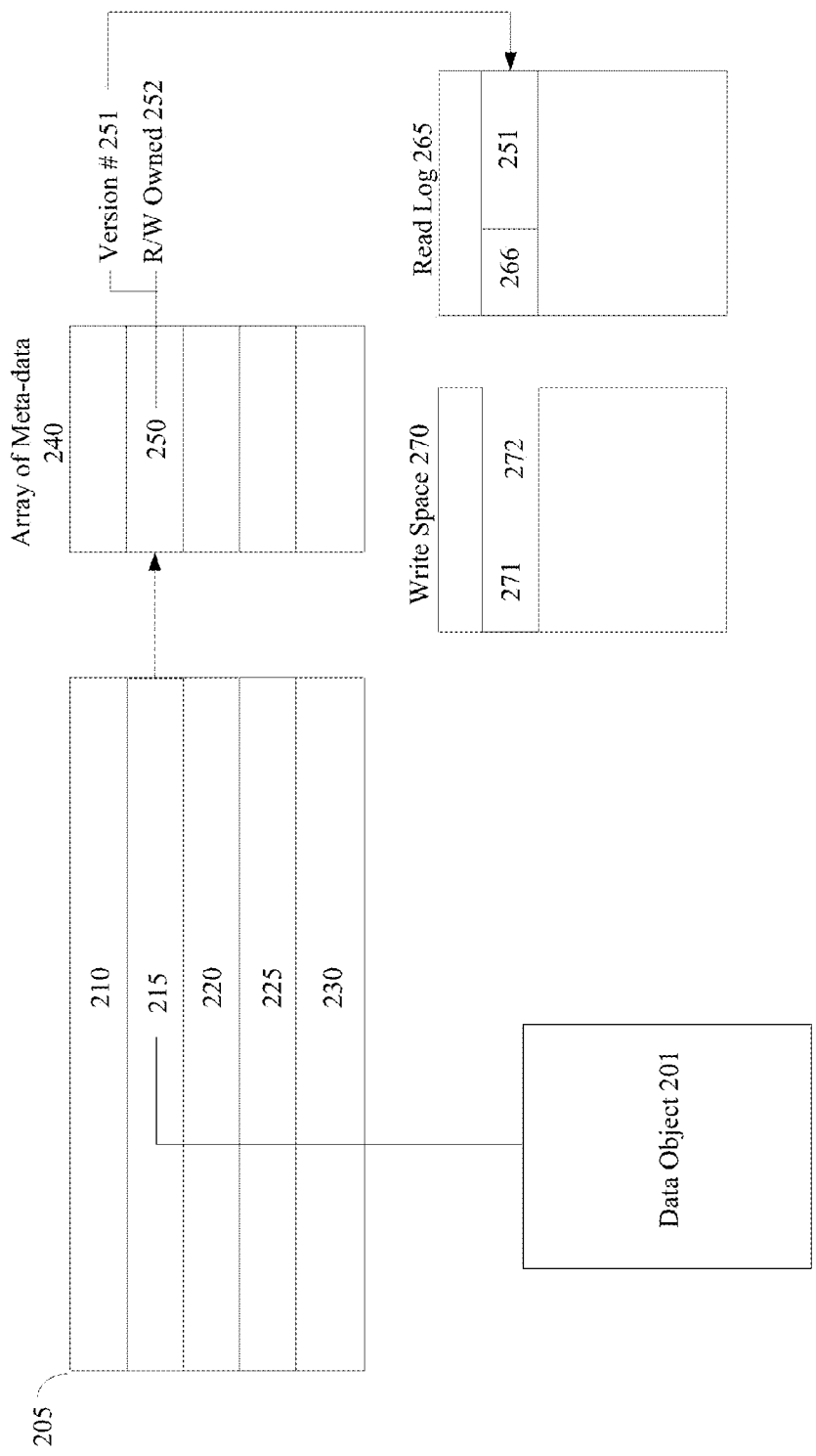
FIG. 2 illustrates an embodiment of a fine grained accelerated Software Transactional Memory (STM) system.

Referring to FIG. 2, a simplified illustrative embodiment of a S™ system is depicted. Data object 201 includes any granularity of data, such as a word, a data element/operand, an instruction, a line of memory, a cache line, a programming language defined object, a field of a programming language defined object, a table, a hash table, or any other known data structure or object. For example, data object 201 includes a (key,value) table, such as an address based lookup table. In one embodiment, an address referencing or associated with data object 201, such as a physical or virtual address, is hashed to index into an array/table of lock/meta-data locations, such as array of meta-data 240. As a specific example, six of the lower bits of an address are masked off and then hashed to index into array of locks 240. Here, data object 201 is said to be associated with cache line 215, as cache line 215 is to hold/cache data object 201. Furthermore, data object 201 is also said to be associated with meta-data location 250, as an address referencing data object 201, is utilized to index into table 240 at location 250.

Usually, a value held in meta-data location 250 indicates whether data object 201 is locked or available. In one embodiment, when data object 201 is locked, meta-data location 250 includes a first value to represent a locked state, such as read/write owned state 252. Yet, any lock or lock state may be utilized and represented in meta-data location 250. When unlocked, or available, meta-data location 250 includes a second value to indicate an unlocked state. In one embodiment, the second value is to represent version number 251. Here, version number 251 is updated, such as incremented, upon a write to data object 201, to track a current version of data object 201.

Here, read/load operations are logged in read log 265 while write/store operations are buffered or logged in write space 270. This logging/buffering is often referred to as barrier operations, since they are a barrier for performing a read or write operation, i.e. they are to be performed before the read or write. In one embodiment, a compiler, when executed, is to compile code to insert address based lookup acceleration operations, as well as other transactional operations, such as barrier operations, start transaction operations, commit operations, abort operations, logging operations, conflict detection operations, etc.

In one embodiment, logging a read includes updating or creating an entry, such as entry 266, in read log 265 with version number 251. Here, read log 265 may resemble an address based lookup table with entry 266 holding an address for data object 201, which is associated with corresponding version number 251 in lookup table 265. Note that read log 265 may be a data object, such as data object 201, which is to be held in a system memory and cached in cache 205.

Two common implementations of an STM include a write buffering STM and a write logging STM. In a write buffering STM, new values are temporarily held in a tentative state. As an example, data object 201 includes write space 270, which is a write buffer. Here, write buffer 270, which may be held in memory as data object 201, potentially resembles an address based lookup table, where a tentative value 272 is associated with an address 271. When a current transaction is committed, tentative values, such as value 272 is copied to corresponding address 271 to make the new value 272 globally visible. In response to an abort of the current transaction, the tentative values are discarded.

In contrast, in a write logging STM, old values are logged in write space 270. Here, write space 270 may also resemble an address based key table, where address 271 corresponds to an old value 272. In response to an abort of a current transaction, the old values are copied back from write log 270 to their corresponding locations. Additionally, during commit, the old values in log 270 are discarded.

Whether write space 270 is utilized as a write-buffer to buffer new values or a write-log to log old values, a write, when committed, releases lock 250. In one embodiment, releasing lock 250 includes returning meta-data location 250 to a value that represents an unlocked state. Alternatively, the value is incremented to represent a new unlocked version value 251. This versioning allows for other transactions to validate their reads that loaded data object 201 by comparing transaction's logged version values in read log 265 to current version value 251.

The example above includes one embodiment of implementing an STM; however, any known implementation of an STM may be used. In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. For example, HTM features, such as annotation bits, may be utilized to accelerate an STM.

Figure 3:
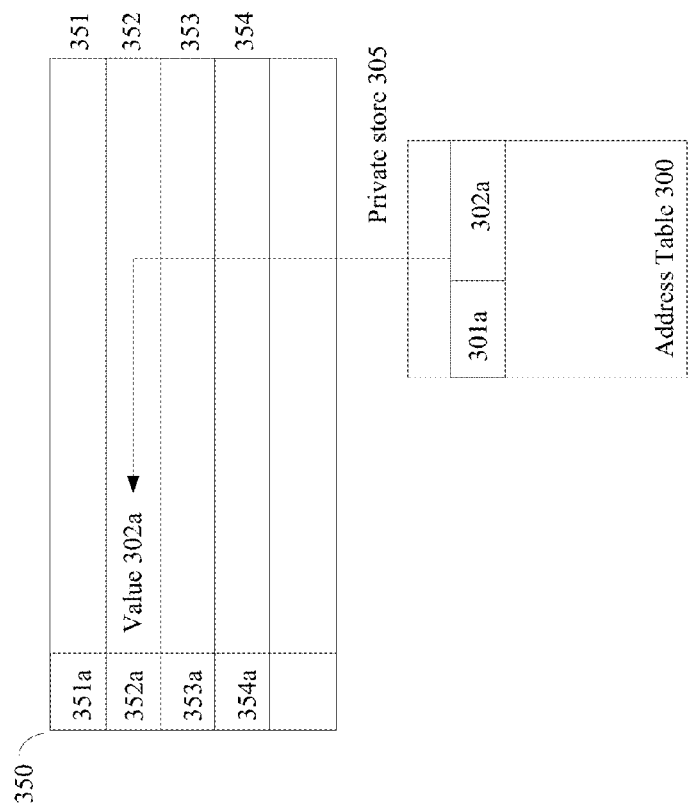
FIG. 3 illustrates an embodiment of structures to support acceleration of software lookups.

Turning to FIG. 3, an embodiment of accelerating lookups in an address based table is illustrated. In one embodiment, lookup table 300 is a <key,value> table, where the <key> is an address. Although accelerating lookups may be utilized in any <key,value> table, a few examples of <address,value> tables utilized in transactional memory implementations include a read log, a write buffer, and a write log. In a read log, often an address loaded from is associated with a version value, i.e. a current version, recorded at the time of the load. In a write buffer, a tentative new value is associated with an address to be updated with the new value upon commit. Similarly, in a write log, address that have been updated during a transaction are associated with old/previous values. However, accessing software table 300 for each lookup in any of these address tables is potentially expensive in execution cycles.

Therefore, in one embodiment, cache 350, which includes cache lines 351-354, is capable of holding cache lines in a private, buffered or ephemeral cache coherency state. Typically, in a Modified Exclusive Shared Invalid (MESI) cache coherency system, cache lines are held in one of the four MESI states. As stated above, in a MESI cache coherency system, after a write to a cache line, that cache line is typically transitioned to a modified coherency state. Previously, upon eviction of a line held in a modified state, the data held in the line would be written-back to a higher level memory in a write-back cache implementation.

In contrast, by allowing a private cache coherency state, local updates in cache 350 are capable of being made without the effects being made globally visible to higher-level memories, and by correlation, to other processing elements. As an example, cache line 352 is transitioned into a private state in response to a private or ephemeral store to line 352. In one embodiment, when cache line 352 is dirty and is to be transitioned to a private state, cache line 352 is first written back to a higher-level memory before the private state transition. When cache line 352 is held in a private state and selected by cache control logic for eviction, then the data held in cache line 352 is discarded instead of written-back to higher level memories. Similarly, if cache 350 employs a write-through policy, then the data is not written through to higher level memories.

As a result, a processing element associated with cache 350 may privately update cache line 352 and later read from privately held line 352. Yet, when another processing element requests line 352 or line 352 is evicted, then the privately held data is potentially discarded to ensure the private data is not globally proliferated. Note that although a write-back cache implementation utilizing MESI coherency states have been described, any implementation of cache or local memory with any coherency states may be utilized for private stores.

In one embodiment, annotation fields 351a-354a are utilized to accelerate lookups in address based tables. Annotation fields 351a-354a are associated with cache lines 351-354, respectively. As a first example, annotation fields 351a-354a are part of the same array as cache lines 351-354. As another example, annotation fields 351a-354a are part of a separate array with separate ports from the array for cache lines 351-354. Here, separate accesses may be made to annotation fields 351a-354a through separate ports without interfering with accesses to cache lines 351-354. However, even when annotation fields 351a-354a are in separate arrays from cache lines 351-354, annotation fields 351a-354a correspond to cache lines 351-354, accordingly.

As an illustrative example, assume <address,value> pair <301a,302a> is to be added to software maintained table 300. Annotation field 352a is initially set to a default state/value. In a default state, annotation field 352a indicates that current <address,value> pairs are not held in cache line 352. Therefore, in response to adding <address,value> pair <301a, 302a> to table 300, in one embodiment, value 302a is privately stored to cache line 352. Here, cache line 352 is associated with address 301a. In addition, responsive to privately storing value 302a to cache line 352, cache line 352 is transitioned to a private state and annotation field 352a is updated to a second value to indicate that cache line 352 holds a current <address,value> pair.

Consequently, in response to an attempted read of address 301a, annotation field 352a is checked. If annotation field 352a holds the default value, then value 302a corresponding to address 301a is retrieved from lookup table 300. In one embodiment, table 300 is a software maintained <address, value> pair table, which is held in a system memory associated with a processor including cache 350. In contrast to retrieving value 302a from table 300, if annotation field 352a holds the second value, then value 302a may be directly loaded from cache line 352. Therefore, in response to initially adding an address value pair to table 300, some extra bookkeeping is performed, i.e. a buffered store of value 302a to cache line 352 is performed. However, during subsequent loads from address 301a the load is "accelerated," i.e. directly loaded from cache line 352 instead of retrieving value 302a from table 300.

Note, when line 352 is selected for eviction, then the private store of value 302a is lost. Additionally, in response to the eviction, annotation field 352a is reset to a default value. Other events may trigger reset of annotation field 352a, such as an abort/commit of a transaction, an external access to address 301a, or other event. Annotation field 352a may include a single storage cell or multiple storage cells to hold single logical values or multiple logical values, as well as be utilized for multiple applications. For example, one storage cell of annotation field 352a may be utilized to accelerate lookups in table 300, as described above, while other storage cells of annotation field 352 may be utilized for other functions. To illustrate, two storage cells may be utilized to track and/or accelerate loads from and writes to cache line 352.

Figure 4:
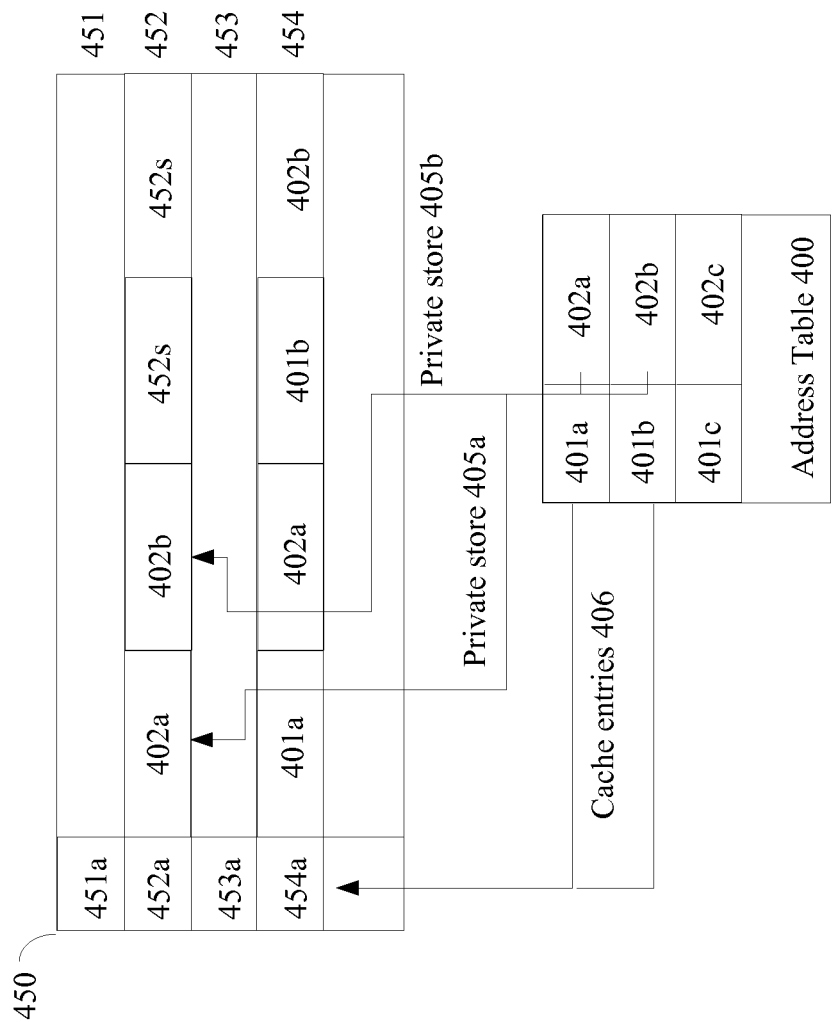
FIG. 4 illustrates another embodiment of structures to support acceleration of software lookups.

Turning to FIG. 4, an embodiment of accelerating address based lookups in an STM is illustrated. As illustrated, cache 450 includes a plurality of lines 451-454, which are associated with annotation field 451a-454a, respectively. Furthermore, each of the cache lines includes multiple locations for holding multiple elements, such as multiple values. As an example, a cache line includes a multiple of two locations to hold a corresponding number of elements, i.e. data operands, addresses, instructions, and/or other values.

In one embodiment, table 400 is a read log to hold address 401a-401c, which are loaded from during execution of a transaction. Here, value 402a-402c include current version values associated with address 401a-401c, respectively, which are recorded upon loads from those addresses during execution of the transaction. Often, version values 402a-402c are utilized to ensure loads during execution of a transaction are valid. For example, if a current version associated with address 401a does not match logged version value 402a, then an update to address 401a has potentially occurred invalidating that load. In another embodiment, table 400 includes a write log table to hold roll-back/previous values 402a-402c for addresses 401a-401c, which have been updated during execution of a transaction.

In yet another embodiment, table 400 includes a write buffer or write buffer table to associate tentative values 402a-402c with address 401a-401c to be updated with those values. Write table 400 may be initially constructed and held in any storage area, such as by storage elements of a processor including cache 450 or by a memory device associated with the processor. During execution of a transaction, writes to addresses 401a-401c are "buffered," i.e. tentatively held by write table 400. In response to a commit of the transaction, tentative values 402a-402c are copied to address locations 401a-401c, respectively. In contrast, in response to an abort of the transaction, values 402a-402c are discarded.

When adding an <address,value> pair, such as <401a, 402a>, to write table 400, a buffered store of value 402a to cache line 452 is performed. Note that address 401a and 401b are associated with cache line 452a. In one embodiment, address translation associates addresses 401a and 401b in locations of cache line 452a; however, any method of association may be utilized. Furthermore, an actual entry of table 400, such as a representation of address 401a and value 402a, may be located at a different address, and therefore, cached elsewhere in memory 450, as illustrated in line 454. In other words, an entry of table 400, which may be initially held in memory, may also be cache in lien 454. Furthermore, although not illustrated in FIG. 4, the privately held cache line, such as line 452, may hold an address and a corresponding value, such as address,value pair <401a,402a>.

In one embodiment, a compiler, when executed, is to insert operations, functions, and/or function calls to perform barrier operations, such as buffered store operations or other functions/calls. As an example, in a write buffering STM where table 400 is a write buffer, an address,value pair is added in response to a write of the value during a transaction to the address.

Figure A below illustrates an embodiment of pseudo code for an algorithm of operations, which may at least be partially inserted by a compiler, for accelerating lookups in address based tables during adding <address,value> pair <401a, 402a> to table 400.

---

FIG. A: Pseudo code for adding an <address,value> pair

Add (address 401a, value 402d) {
    Add (address 401a, value 402a) to table 400
    If (452a == 1) {
        Buffered store of value 402a into address 401a;
    }
    Else if (452a == 0) {
        452a=1;

---

FIG. A: Pseudo code for adding an <address,value> pair

For(all locations in cache line 452) {
    Buffered store of value //value 402a and 402b
}
Return;}

---

Initially, annotation field 452a holds a default value, such as a logical zero, to indicate no current <address,value> pair is held in cache line 452. Address 401a and value 402a are added to table 400, such as creating an entry in table 400. Annotation field 452a is checked. If annotation field 452a holds a logical one indicating current pairs are held in cache line 452, then buffered or private store 405a of value 402a into address 401a is performed.

In contrast, if annotation field 452 holds the default value, i.e. a logical zero, then annotation bit 452a is set to a logical one. Furthermore, in one embodiment, private stores for all values corresponding to all locations in cache line 452 are performed. Here, annotation field 452a includes a single storage cell to hold a logical one or zero to indicate whether current pairs are held in line 452. Consequently, if private store 405a is performed and private store 405b is not performed to update to a valid value 402b in cache line 452, then upon a subsequent read of cache line 452, the read assumes from annotation field 452a being set to a logical one that value 402b is valid. In other words, all pairs in cache line 452 are updated to ensure later loads of other values from cache line 452 are valid.

In the alternative, annotation field 452a may includes a storage cell or other ability for storing logical values associated with each location in cache line 452. As a result, in one embodiment, only private store 405a is performed and the corresponding bit/storage cell within annotation field 452a is set to a logical one. Note that address 401a-c may refer to virtual and/or physical addresses. In addition, address 401a and 401b may be associated with cache line 452 through address translation, direct mapping, set association, full association, or any other known method for cache line/location selection.

In one embodiment, table 400 is constructed in cache line form. Here, table 400 contains address,value pairs for all locations in a cache line. However, not every location in a cache line may be currently associated with a value. Therefore, in one embodiment, locations in cache, such as 452s, are left empty. In another embodiment, a sentinel value is held in cache location 452s to denote the location does not contain a value pair.

Below in Figure B, an embodiment of pseudo code for accelerating lookups in an address based table is illustrated.

--- get (address 401a) {
    load value at address;
    If (452a == 0) {
        lookup value 402a from table 400;}
    return;}

---

In response to an attempt to get a value paired with address 401a, the address is directly loaded from. If annotation field 452a is a logical one, i.e. not a logical zero, which indicates the current value pair 402a is located in cache line 452, then the loaded value is correct/valid and may be returned. However, if annotation field 452a is set to the default value, such as a logical zero, then value 402a is obtained from table 400.

As an example, assume table 400 is a write buffer table in a write buffering STM implementation. When a transaction writes to a location, as discussed supra, values may be privately held in cache and directly loaded based on the value of corresponding annotation fields, instead of looking up the value in table 400 each load.

Figure 5A:
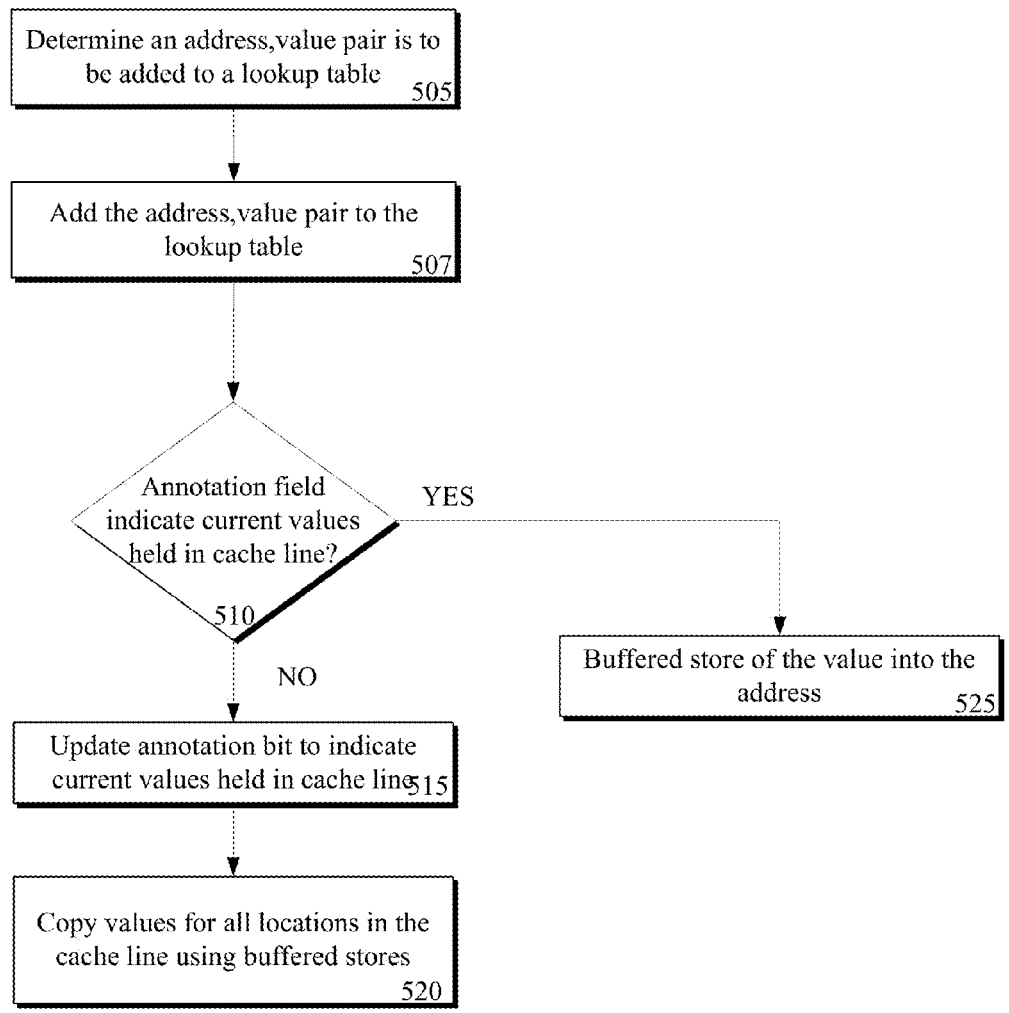
FIG. 5 illustrates an embodiment of a flow diagram for a method of a compiler inserting operations to accelerate write instructions in a Software Transactional Memory (STM) system.
Figure 5B:
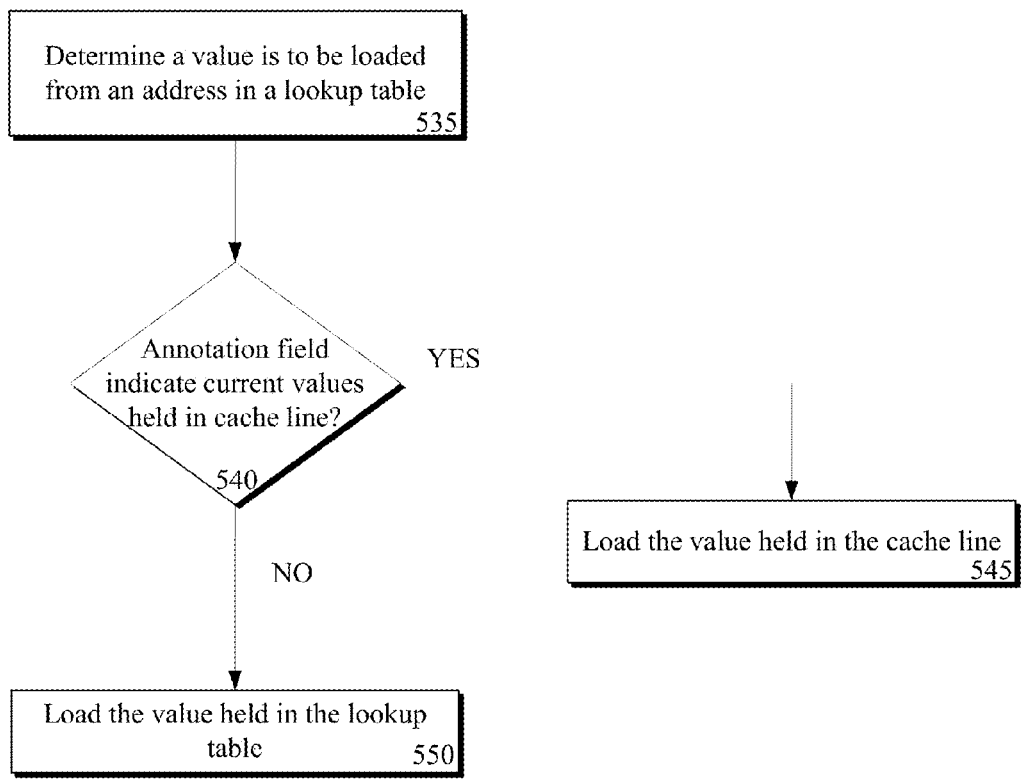

Referring to FIGS. 5a-5b, an embodiment of a flow diagram for a method of accelerating lookups in an address based table is illustrated. In flow 505, it is determined an <address, value> pair is to be added to an address based table. Although As an example, the address based table is a write buffer table that associates an address with a tentative value. In one embodiment, a compiler detects writes/stores to the address based table and loads/reads from the address based table during compilation. As a result, the compiler inserts functions, calls to the functions, and/or operations to implement the methods described in regards to FIGS. 5a-5b.

Next, in flow 507, the <address,value> pair is added to the lookup table. Here, either an entry is created in the table or the value corresponding to the address is updated. An annotation field corresponding to a cache line to hold the <address, value> pair is checked. If the annotation field holds a value to indicate current <address,value> pairs are held in the associated cache line, then in flow 525 a buffered store to the address of the value is performed. The cache line is transitioned to a private/buffered state.

In contrast, if the annotation field holds a value indicating current pairs are not held in the cache line, then in flow 515 the annotation bit is updated to a value to indicate current values are held in the cache line. Furthermore, in an embodiment, where a cache line is capable of holding values for multiple locations, values for all locations in the cache line are copied from the table to the locations utilizing buffered stores in flow 520. Consequently, the cache line is transitioned to a buffered/private state, and execution continues in flow 530.

Referring to FIG. 5b, a load/get value from an address in the lookup table is detected. Again, a compiler potentially detects loads from the address table during code compilation. Here, operations, calls, and/or functions are inserted in the code by the compiler to perform flows 540-550. In flow 540, an annotation field corresponding to a cache line associated with the address to be loaded from is checked. If the annotation field is set to indicate current values are held in the cache line, then the value for the address is loaded from the cache line without looking up the value from the address table, i.e. the load is "accelerated." Alternatively, if the annotation field is reset to a vale to indicate current values are not held in the cache line, then the value associated with the address is retrieved from the table.

Note that the flows in FIGS. 5a-5b are illustrated in a linear fashion. However, in different embodiments, flows may occur in any order. For example, in FIG. 5b, instead of loading the value from a cache line associated with the address in flow 545 after checking the annotation field, the value may be loaded immediately. Then annotation field is checked in flow 540. Here, in response to determining the cache line holds current values, operation is simply returned or continued, instead of loading the value again in flow 545 to accelerate the load even further.

As illustrated above, lookups in an address based table are accelerated through use of annotation fields on cache line. When a store or write to an address based table is detected, the value to be written is held in a cache line associated with the address utilizing a private store. As a result, the tentative value may be quickly locally loaded from a cache without an expensive lookup in the table, while the value is not made globally visible through use of buffered and private stores. Consequently, these addressed based lookups may be accelerated with minimal extra bookkeeping upon writes to an address.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory tangible storage device including program code which, when executed by a machine, causes the machine to perform the operations of:
    determining a memory access operation, when executed, is to add an address and a value pair to an address based table;
    inserting an annotation operation, when executed, to determine an annotation value held in an annotation field corresponding to a cache memory line associated with the address; and
    inserting a first buffered store operation, when executed, to perform a buffered store of the value into the cache line that is to cause the cache line to be held in a buffered cache coherency state in response to the annotation value being a first value, wherein in the buffered cache coherency state local updates to the cache line are not globally visible to higher-level memories or other processing elements.

2. The storage device of claim 1, further to perform the operations of: inserting a plurality of buffered store operations, when executed, to perform buffered stores of a plurality of values held in the address based table for a plurality of locations in the cache line in response to the annotation value being a second value.

3. The storage device of claim 2, further to perform the operations of: inserting an update operation, when executed, to update the annotation value to the first value in response to the annotation value being the second value.

4. The storage device of claim 3, wherein the address based table includes a write buffer table, and wherein the memory access operation includes a store operation to store the value in the address.

5. The storage device of claim 1, further to perform the operations of:
   determining a second memory access operation, when executed, is to load the value corresponding to the address;
   inserting a load operation, when executed, to load the value from the address; and
   inserting a lookup operation, when executed, to lookup the value in the address based table in response to the annotation value being a second value.

6. The storage device of claim 5, wherein the address based table includes a write buffer table, and wherein the memory access operation includes a load operation to load the value from the address.

7. A method comprising:
   adding an address and a value pair to an address based lookup table; and
   performing a private store to a cache line associated with the address in response to an annotation field associated with the cache line holding a first value to indicate the value is a current value for the address; and
   transitioning the cache line to a private cache coherency state in response to performing the private store, wherein in the private cache coherency state local updates to the cache line are not globally visible to higher-level memories or other processing elements.

8. The method of claim 7, further comprising:
   in response to the annotation field holding a second value to indicate the value is not a current value for the address:
      updating the annotation field to hold the first value to indicate the value is a current value for the address; and
      privately storing a plurality of values including the value from the address based lookup table to a plurality of locations in the cache line.

9. The method of claim 7, further comprising:
   selecting the cache line for eviction; and
   not writing back the value to a higher-level memory in response to selecting the cache line for eviction when the cache line is in the private cache coherency state.

10. The method of claim 7, wherein the address based lookup table includes a transactional write buffer table, and wherein determining an address and a value pair is to be added to the transactional write buffer is in response to encountering a transactional write operation to store to the address.

11. The method of claim 7, further comprising:
    determining the value is to be looked up in the address based table based on the address;
    loading the value from the cache line in response to the annotation field holding the first value to indicate the value is a current value for the address; and
    loading the value from the address based table in response to the annotation field holding the second value to indicate the value is not a current value for the address.

12. The method of claim 11, wherein the address based lookup table includes a transactional read log table, and wherein determining the value is to be looked up in the transactional write buffer based on the address is in response to encountering a transactional read operation to load from the address.

13. An apparatus comprising:
    decode logic adapted to decode a private store instruction, the private store instruction to include a reference to an address and a value;
    a cache memory adapted to:
       store the value in the cache line,
       set an annotation field to a current value, if the annotation field holds a default value, to indicate the value in the cache line is a current value for the address, and
       transition the cache line to a buffered cache coherency state in response to the decode logic decoding the private store instruction, wherein in the buffered cache coherency state local updates to the cache line are not globally visible to higher-level memories or other processing elements.

14. The apparatus of claim 13, wherein the cache memory is further adapted to not write-back the value from the cache line to a higher-level memory in response the cache line being selected for eviction and being held in the buffered cache coherency state.

15. The apparatus of claim 13, wherein the annotation field, when holding the default value, is to indicate the current value for the address is held in the software maintained lookup table.

16. The apparatus of claim 13, wherein the cache memory, in response to a request from another processing element not associated with the store of value to the cache line and the cache line being in the buffered cache coherency state, is to further adapted to provide invalid response to the request.

17. The apparatus of claim 13, wherein the cache memory is and further adapted to allow a local processing element associated with the store of value to the cache line to subsequently update and read from the cache line.

18. A non-transitory, tangible storage device including program code, which when executed by a machine, causes the machine to perform the operations of:
    adding an address and a value pair to an address based lookup table;
    in response to an annotation field associated with the cache line holding a default value to indicate no address pairs are held in the cache line:
       updating the annotation field to hold an updated value to indicate address pairs are held in the cache line, and
       privately storing a plurality of values from the address based lookup table to a plurality of locations in the cache line;
    performing a private store to a cache line associated with the address in response to adding the address and the value pair to the address based lookup table; and
    transitioning the cache line to a private cache coherency state in response to performing the private store.

19. The storage device of claim 18, wherein the program code, when executed by the machine, further causes the machine to perform the operations of: selecting the cache line for eviction; and not writing back the value to a higher-level memory in response to selecting the cache line for eviction when the cache line is in the private cache coherency state.

20. The storage device of claim 18, wherein the address based lookup table includes a transactional write buffer table, and wherein adding an address and a value pair to the transactional write buffer is in response to encountering a transactional write operation to store to the address.

21. The storage device of claim 20, wherein the program code, when executed by the machine, further causes the machine to perform the operations of:
    determining the value is to be looked up in the address based table based on the address;

loading the value from the cache line in response to the annotation field holding the updated value; and loading the value from the address based table in response to the annotation field holding the default value.

22. A non-transitory tangible storage device including program code, which when executed by a machine, causes the machine to perform the operations of:

loading a cached value from a cache line associated with an address, the cache line being held in a buffered cache coherency state, wherein in the buffered cache coherency state local updates to the cache line are not globally visible to higher-level memories or other processing elements;

determining an annotation value from a hardware annotation field associated with the cache line;

returning the cached value in response to the annotation value including a current value to indicate the cached value is a current value associated with the address; and loading the cached value from an entry of a software maintained address based lookup table in response to the annotation value including a default value to indicate the cached value is not the current value associated with the address.

23. The storage device of claim 22, wherein software maintained address based lookup table is selected from a group consisting of a write-log, a read log, and a write-buffer.

* * * * *

UNITED STATES PATENT AND TRADEMARK OFFICE
CERTIFICATE OF CORRECTION

| | | |
|---|---|---|
| PATENT NO. | : 8,656,113 B2 | Page 1 of 1 |
| APPLICATION NO. | : 13/104681 | |
| DATED | : February 18, 2014 | |
| INVENTOR(S) | : Saha et al. | |

It is certified that error appears in the above-identified patent and that said Letters Patent is hereby corrected as shown below:

In the Specification

In column 5, at line 20 delete, "$S^{TM}$" and insert --STM--.

In column 6, at line 2 delete, "$S^{TM}$" and insert --STM--.

Signed and Sealed this
Thirteenth Day of May, 2014

Michelle K. Lee
*Deputy Director of the United States Patent and Trademark Office*